INVENTOR.
DONALD WATSON BINGLEY

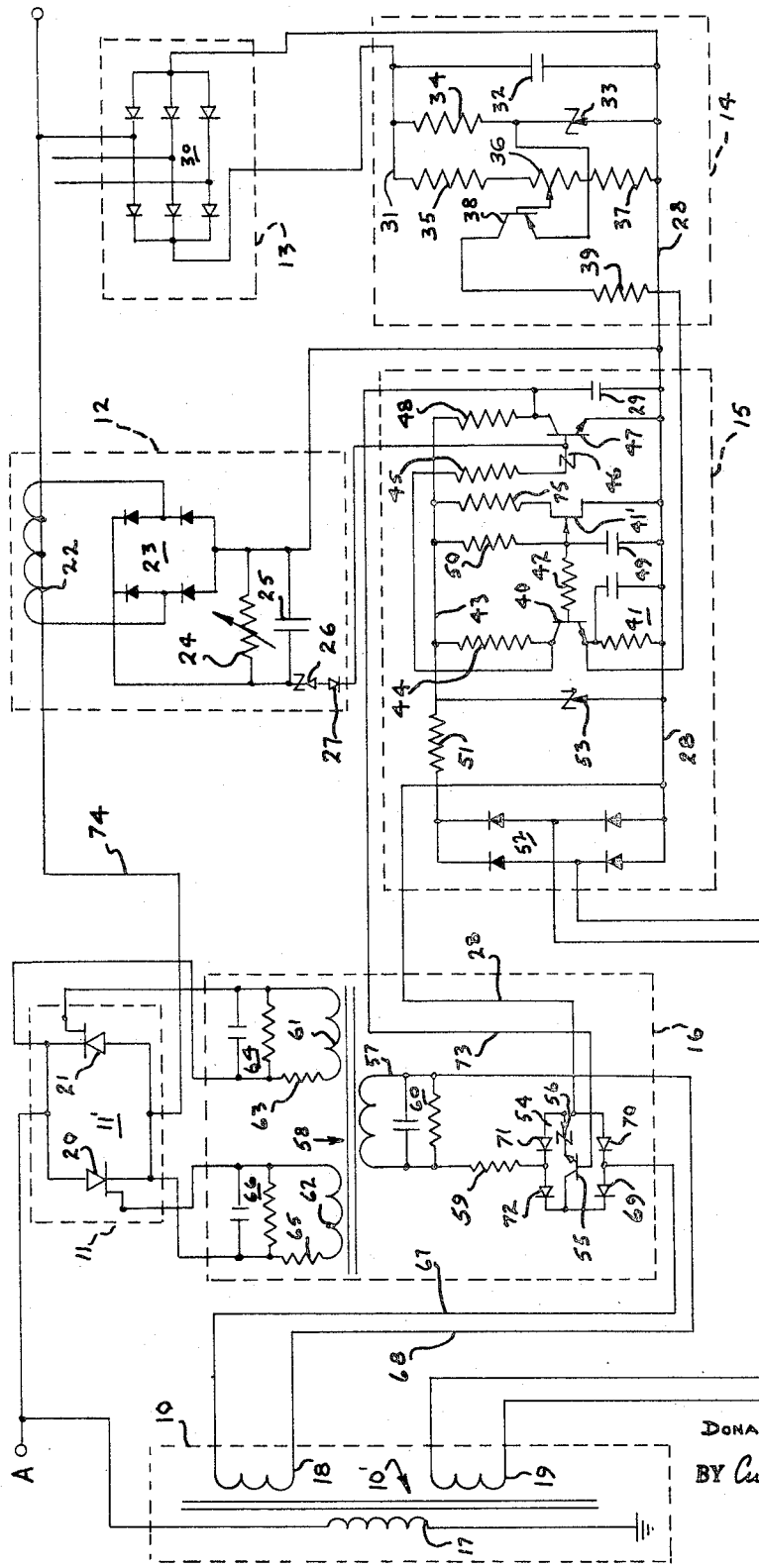

United States Patent Office

3,409,821
Patented Nov. 5, 1968

3,409,821
REGULATOR CIRCUIT TO PROVIDE A REGULATED OUTPUT INSENSITIVE TO INPUT PHASE AND FREQUENCY VARIATIONS AND INPUT VOLTAGE AND TRANSIENT CONDITIONS
Donald Watson Bingley, Mechanicsburg, Pa., assignor to AMP Incorporated, Harrisburg, Pa.
Filed Apr. 22, 1965, Ser. No. 450,014
3 Claims. (Cl. 323—20)

ABSTRACT OF THE DISCLOSURE

A pair of silicon controlled rectifiers are connected in inverse parallel relationship in a power circuit. Gating pulses are supplied to the rectifiers in response to the voltage and current outputs without any influence by the frequency of the input voltage.

---

Figure 1:
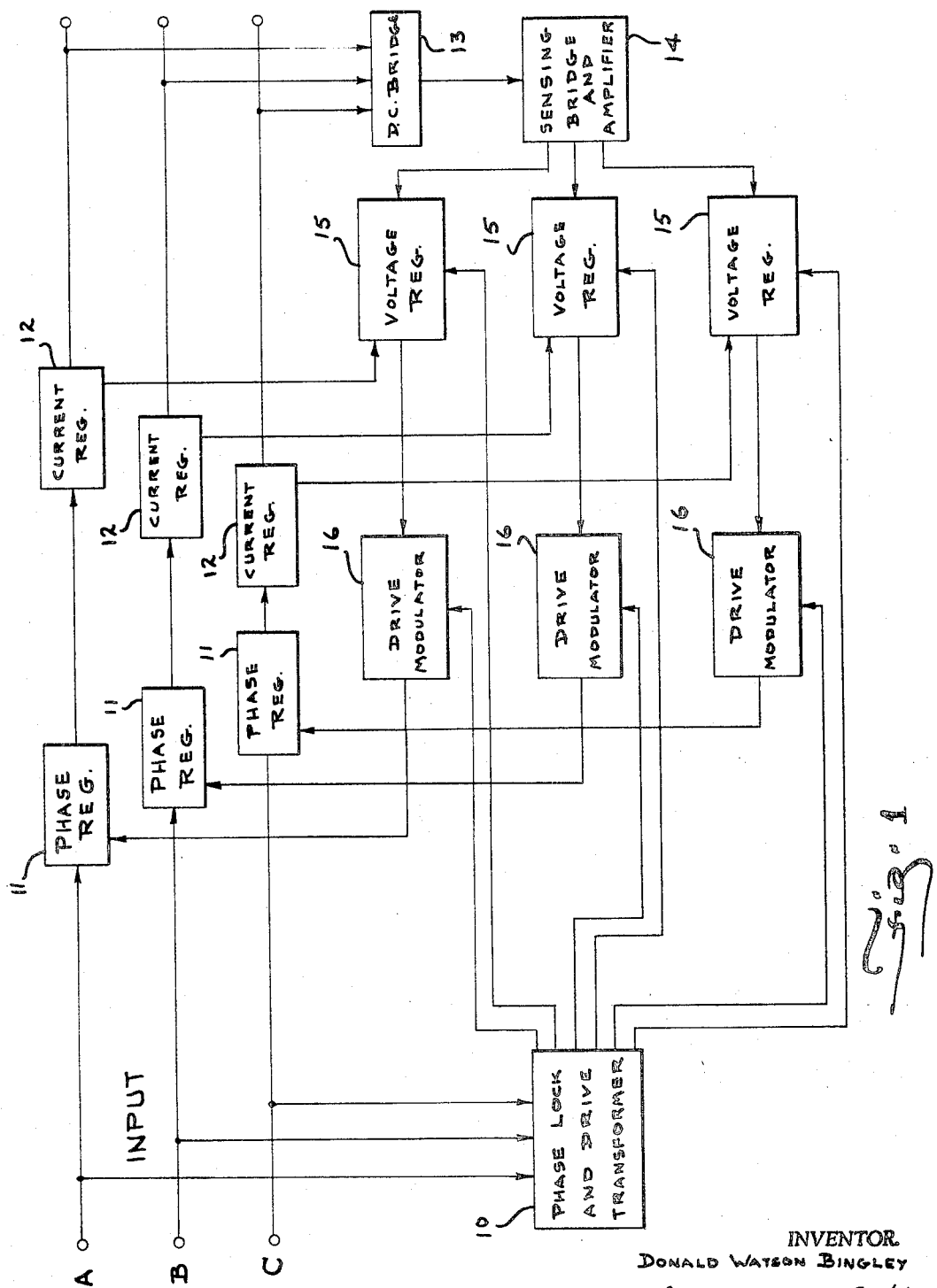

This invention relates to a regulator circuit and more particularly to a polyphase regulator circuit.

In the field of polyphase power systems, it is frequently desired to regulate the output from these power systems for fluctuations of line voltage, load and temperature effects in order to provide a regulated source of supply. This is especially true when a regulated source of supply is needed to operate a critical piece of equipment which has to operate within defined limits and within a very small tolerance range. Heretofore, voltage regulation devices have been provided, but these have proved to be cumbersome, inaccurate and incapable of supplying stabilized power output, thereby rendering them unsatisfactory. Thus, there has been a need for an uncumbersome voltage regulation device to accurately provide a primary source of electrical supply having a frequency range from a low value to a high value which covers any power frequency range.

It is, therefore, a primary object of the present invention to provide control circuitry of the electronic variety to regulate a power supply.

Another object of the present invention is to provide a voltage regulation circuit that is noncumbersome.

A further object of the present invention is to provide a polyphase voltage regulation circuit that produces an accurate output which is free of fluctuations of line voltage and load as well as temperature effects.

A still further object of the present invention is to provide a regulated source of primary voltage having high current capacity.

An additional object of the present invention is the provision of a regulated source of primary voltage having an extremely high efficiency factor.

Still a further object of the present invention is the provision of a regulated source of primary voltage which is insensitive to input phase angle variations, insensitive to input voltage and transient conditions, insensitive to input frequency variations and insensitive to input voltage waveform.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration and principles thereof and the manner of applying it in practical use so that they may modify it in various forms, each as may be best suited to the conditions of a particular use.

In the drawings:
FIGURE 1 is a general block diagram of the circuit arrangement of the present invention; and
FIGURE 2 is a diagrammatic representation of the circuit arrangement of FIGURE 1.

Turning now to the drawings, there is illustrated in FIGURE 1 a three-phase input A, B and C from a conventional power source, for example, of four-hundred cycle, three-phase, two-hundred volts. Each input is connected to a phase lock and drive transformer 10 and a phase regulation circuit 11. Each phase regulation circuit is connected to a respective current regulation circuit 12, the outputs from current regulation circuits 12 are connected to some load (not shown) as well as being connected to a DC bridge 13. The output from DC bridge 13 is connected to a sensing bridge and amplifier circuit 14 and the outputs therefrom are connected to respective voltage regulation circuits 15. Current regulation circuits 12 are connected to respective voltage regulation circuits 15. The outputs of voltage regulation circuits 15 are connected to respective drive modulator circuits 16. The outputs from phase lock and drive transformer circuit 10 are connected to respective drive modulator and voltage regulation circuits 15. The outputs from drive modulator circuits 16 are connected to respective phase regulation circuits 11.

Turning now to FIGURE 2, there is illustrated circuitry in conjunction with input lead A only since the circuitry in conjunction with input leads B and C is the same and a diagrammatic illustration of all of the circuits for all the input leads would unnecessarily burden the description of the present invention. Phase lock and drive transformer 10 includes a transformer 10' having a primary winding 17, and secondary windings 18 and 19. Phase regulator 11 comprises silicon-controlled rectifiers 20 and 21 connected in series relationship with the anode of rectifier 21 connected to the cathode of rectifier 20 while the anode of rectifier 20 is connected to the cathode of rectifier 21 as a bridge 11'. Lead A is serially connected to a leg of this bridge as an input thereto and lead A is connected to another leg of the bridge as an output therefrom.

Current regulation circuit 12 includes a toroid coil 22 surrounding lead A. The ends of coil 22 are connected as input leads to respective legs of diode bridge 23. Potentiometer 24 and capacitor 25 are connected in parallel across the output leads of bridge 23, and a Zener diode 26 and diode 27 are connected in series in one of the output leads. The other output lead from bridge 23 is connected to lead 28.

DC bridge 13 is a diode bridge 30, and lead A is connected to one of the legs of bridge 30. One of the outputs of DC bridge 13 is connected directly to lead 28 located in circuits 14 and 15. The other output from DC bridge 13 is connected to lead 31 in circuit 14.

Sensing bridge and amplifier circuit 14 comprises a capacitor 32, serially connected Zener diode 33 and resistor 34. Resistor 35, potentiometer 36 and resistor 37 are connected across leads 31 and 28. The emitter of transistor 38 is connected to the junction of resistor 34 and Zener diode 33 while the base of this transistor is connected to potentiometer 36. The collector of transistor 38 is connected via resistor 39 to the emitter of transistor 40 in voltage regulation circuit 15 as an input thereto.

The emitter of transistor 40 in circuit 15 is connected to lead 28 via a parallel RC network 41. The base of transistor 40 is connected to the emitter of unijunction transistor 41' via resistor 42. The collector of transistor 40 is connected to lead 43 through resistor 44. The collector of transistor 40 is also connected via serially connected resistor 45 and Zener diode 46 to the base of transistor 47. The output from current regulation circuit 12 containing Zener diode 26 and diode 27 is connected to the junction of Zener diode 46 and the base of transistor 47.

The emitter of transistor 47 is connected directly to lead 28 while the collector of this transistor is connected to lead 43 through resistor 48 and to lead 28 via capacitor 29. A series network of capacitor 49 and resistor 50 is connected across leads 28 and 43 and the junction between this capacitor and resistor is connected to the emitter of unijunction transistor 41'. One base of transistor 41' is connected to lead 28 while the other base of this transistor is connected to lead 43 via resistor 75. Lead 28 is connected to one leg of diode bridge 52, and lead 43 is connected to another leg of diode bridge 52 via resistor 51. Secondary winding 19 in phase lock and drive transformer 10 is connected to respective other legs of diode bridge 52. One side of Zener diode 53 is connected to lead 28 between RC network 41 and diode bridge 52 while the other side of this Zener diode is connected to lead 43 between the junctions of resistors 44 and 51.

One output lead from circuit 15 is connected to a leg of diode bridge 54 in drive modulator circuit 16 while the other output lead from circuit 15 is connected to the collector of transistor 47 thereof and to the base of transistor 55 in circuit 16.

The collector of transistor 55 is connected to another leg of diode bridge 54, and the emitter of this transistor is connected via Zener diode 56 to the one leg of the diode bridge. One side of secondary winding 18 of phase lock and drive transformer 10 is connected to a further leg of diode bridge 54 while the other side of secondary winding 18 is connected to one side of primary winding 57 of transformer 58. The other side of winding 57 is connected to a still further leg of diode bridge 54 via resistor 59. An RC network 60 is connected in shunt with winding 57. One side of secondary winding 61 is connected via resistor 63 to the input leg of bridge 11' while the other side of winding 61 is connected to the gate of rectifier 21. An RC network 64 is connected in shunt with winding 61. One side of secondary winding 62 is connected via resistor 65 to the output leg of bridge 11' while the other side of winding 62 is connected to the gate of rectifier 20. An RC network 66 is connected in shunt with winding 62.

The system is set into operation by application of three phase power supply to terminals A, B and C, FIGURE 1. This applies power to the phase lock and drive transformer. The output of this transformer feeds into drive modulator circuits 16 and voltage regulator circuits 15 for the three phases A, B and C. Each of the three phases has identical drive modulator and voltage regulator circuits.

The drive modulator circuits in turn feed into their respective phase regulator circuits 11. Sensing bridge and amplifier circuit 14 feeds into the voltage regulator circuits and in a balanced three phase load condition can be common to all of them. Also, DC bridge 13 for a balanced three phase load condition can similarly be common for all three phases.

In the case of an unbalanced load condition on the three phase output, a separate DC bridge 13 and a separate sensing bridge and amplifier circuit 14 would be required for each phase.

Current regulator circuit 12 is preferably used on each phase when it is desired to provide current regulation and it feeds into its respective voltage regulator circuit 15 for balanced or unbalanced line conditions.

As the three phases are effectively duplicated, then description for one phase system as illustrated in FIGURE 2 will indicate operation for the three phase system.

With reference to FIGURE 2, primary 17 of phase lock and drive transformer 10 is connected between phase A and ground of the input supply. In the case of phases B and C, each would be connected between B and ground and C and ground, respectively.

Secondary winding 18 is connected to drive modulator circuit 16. Lead 67 is connected to the anode of diode 69 which in turn is connected to the cathode of diode 70. These diodes form part of diode bridge 54 comprising diodes 69 thru 72. Connected across the DC side of the diode bridge, namely between the common cathode point of diodes 69 and 72, i.e. the positive side of the bridge, and the common anode point of diode 70 and 71, i.e. the negative side of the bridge, is transistor 55 in series with Zener diode 56.

The negative side of this bridge is connected to common lead 28. The AC side of bridge 54 at the point between the anode of diode 72 and the cathode of diode 71 is connected to resistor 59, which is in turn connected to RC network 60 and primary 57 of trigger transformer 58. The return path to winding 18 is thru lead 68 which in turn is connected to the other side of RC network 60 and winding 57, respectively.

The waveform from winding 18 is phase modulated by means of switching transistor 55 and Zener diode 56 combination synchronously with the waveform. By varying the angle of phase, namely, by advancing or delaying the switching of transistor 55 and Zener diode 56 combination with respect to each half cycle of the incoming waveform, it is possible to advance or delay the trigger output of trigger transformer 58.

RC network 60 is required to absorb the inductive energy stored in winding 57 of trigger transformer 58 when transistor 55 and Zener diode 56 combination is switched off; this is necessary to eliminate spurious triggering of SCR's 20 and 21 through secondaries 61 and 62 of trigger transformer 58.

SCR's 20 and 21 are connected back to back and conduct each half cycle of the incoming waveform in response to the trigger signal which is in synchronism with the applied input waveform. The resulting modulated waveform, is transmitted thru lead 74 to the external load which could be connected either between phases or phase and neutral. The operation of drive modulator circuit 16 is controlled by voltage regulator circuit 15 which is connected to the drive modulator circuit by means of leads 73 and 28.

The operation of voltage regulator circuit 15 is controlled by the error signal emitting from sensing bridge and amplifier circuit 14. The power input to voltage regulator circuit 15 is derived from winding 19 of the phase block and drive transformer 10. This feeds into diode bridge 52. The negative side of this bridge is connected to common lead 28 while positive output of the bridge is connected to resistor 51 which in turn is connected to the cathode of Zener diode 53, the anode of diode 53 being connected to common point lead 28. The waveform across Zener diode 53 is a DC level controlled by the reference voltage point of the Zener diode with transient excursions of voltage across Zener diode 53 to zero every half cycle of the applied input waveform.

The combination of resistors 50 and 75, unijunction transistor 41' and capacitor 49 result in a triangular waveform across capacitor 49 when voltage is applied which is synchronized to twice the applied input frequency by result of the voltage across Zener 53 reducing to zero every half cycle of the input frequency. This triangular waveform is impressed thru resistor 42 to the base of transistor 40. Transistor 40 will then conduct for a duration not exceeding the length of one half cycle and anywhere between, depending on bias voltage level impressed across resistor capacitor combination 41 which is set by the output of sensing bridge and amplifier circuit 14.

When transistor 40 conducts, its collector voltage will approach that of the bias level. When transistor 40 is in the non-conducting condition, its collector will approach the voltage across Zener diode 53. When transistor 40 is in the non-conducting condition, full voltage will be applied thru resistor 44 and resistor 45 to Zener diode 46 which will conduct and apply a signal to the base of transistor 47 for the duration of time that transistor 40 is in the non-conducting state. When transistor 40 is in the conducting state, Zener diode 46 will not conduct, therefore there will be no signal to transistor 47.

While transistor 47 is in the non-conducting state, its collector will be near the maximum voltage across Zener diode 53 and will therefore transmit a signal thru resistor 48 to the base of transistor 55 in drive modulator circuit 16 switching transistor 55 on. When a signal is applied to transistor 47 switching it into a conducting mode, the signal will be removed from the base of transistor 55 in circuit 16 switching it off.

The voltage bias level across resistor capacitor combination 41 is derived by current thru resistor 39 from transistor 38 in the sensing bridge and amplifier circuit 14. The potential divider network of resistors 35 and 37 and potentiometer 36 senses the change of output voltage. This change is referred to as reference voltage that is derived across Zener diode 33. The error signal is impressed between the emitter and base of transistor 38 which acts as the amplifier. Capacitor 32 serves the purpose of reducing ripple and transient effects from DC bridge 13. DC bridge 13 comprises six diodes 30 which are in turn connected by pairs to respective phases of the three phase regulator circuits. As previously mentioned, for an unbalanced AC load condition or for a single or multiphase condition, individual DC bridges would be connected across each phase. These bridges would then feed into individual sensing bridge and amplifiers circuits 14, one per phase.

The overload and current sensing is achieved by means of current transformer 22 contained in current regulator circuit 12; the output of this transformer feeds into diode bridge 23. The current output of this bridge is impressed across variable resistor 24 which will determine a voltage proportional to the current thru resistor 24. When the voltage impressed across resistor 24 reaches the Zener reference voltage of Zener diode 26 and forward bias voltage of diode 27, Zener diode 26 and diode 27 combination will conduct. This signal will then be conducted to the base of transistor 47 and will override the signal already being impressed thru Zener diode 46. This will put transistor 47 into the conducting state which will then turn off the signal to transistor 55 thereby cutting back the trigger voltage to SCR's 20 and 21 contained in phase regulator circuit 11. This provides the desired current limiting action.

The operation of the circuit is described in accordance with the following:

Assuming power applied and circuits functioning as described previously in columns 3 to 5, voltage regulation will occur as follows:

If output voltage increases instantaneously due to either an increase in input voltage or a reduction in load current, sensing bridge 13 will increase DC voltage on 32. This increases DC voltage across sensing resistor combination 35, 36, 37 and raises emitter voltage of sensing amplifier transistor 38. Since the base of transistor 38 will remain essentially at constant voltage by virtue of Zener action of Zener diode 33 and resistor 34 combination, the resultant increase of error signal voltage between the emitter and base of transistor 38 will increase its conduction. This in turn will raise bias level across resistor 41 at emitter of transistor 40.

Since the base of transistor 40 is referenced to sawtooth waveform generated at emitter or unijunction transistor 41' through resistor 42, an increase in emitter voltage of transistor 40 due to increased bias level will cause transistor 40 to conduct higher on the sawtooth wave but later in the synchronization period which tends to shorten the conduction period of transistor 40.

When transistor 40 is on it will conduct current through resistor 44 thereby abruptly reducing voltage applied to Zener 46 through resistor 45 which causes Zener 46 to become nonconducting. This in turn will remove signal from the base of transistor 47 thereby turning transistor 47 off for the duration of time that transisor 40 is conducting.

When transistor 47 is turned off, its collector voltage will rise through resistor 48 towards the synchronization voltage across Zener 53. This applies a highly positive bias signal to the base of transistor 55 in drive modulator 16 and transfers it from a nonconductive to a highly conductive mode. With transistor 55 now conducting, AC voltage will be transferred from winding 18 of transformer 10' through the diode bridge 54 to the primary winding 57 and into secondary winding 61 and 62 of SCR trigger transformer 58.

As previously described, the increase in output voltage, which increased the error signal at sensing transistor 38, raised bias level at resistor 41 and reduced conduction time of transistors 40 and 55, will now result in an increased retardation or delay of the phase or firing angle of the modulator SCR trigger waveform. Depending upon which trigger signal is in synchronism with the incoming half cycle waveform, either SCR 20 or 21 in the phase regulator circuit will be switched alternately into conduction and will transfer the delayed and reduced portions of modulated waveform into the output load, thus effecting a reduction in voltage and power delivered to the load in proportion to error signal initially created in the sensing amplifier circuit 14 by the instantaneous output voltage rise.

In the event of an initial decrease in output voltage, a reverse of the previously described sequence of operational events would occur to advance SCR conduction or firing angle and bring about a resultant increase in output voltage. As to the effect of current regulator circuit 12, it should be pointed out that its function is more that of a protective circuit or current limiter in the event of an overload or short created by output load, rather than a linear current regulator. The voltage regulator circuit 15 has sufficient capacity to regulate output voltage over the normal load current range.

In the event however of an overload current regulator circuit 12 would come into action as follows:

The current transformer 22 will sense output current and transmit an accurate signal proportioned to load current through diode bridge 23 and into adjust potentiometer 24 and filter capacitor 25 as a DC voltage. The variable resistor 24 can be adjusted to vary DC voltage on capacitor 25 depending upon the overload level desired. As load current increases, the DC voltage across resistor 24 increases until reference voltage of Zener 26 and forward bias voltage diode 27 are exceeded, whereupon Zener 26 and diode 27 will conduct and transmit a conduction signal to the base of transistor 47 thus overriding any previously present signal from Zener diode 46. This action will drive transistor 47 into conduction and remove signal from the base of transistor 55 and turn it off. This will remove SCR trigger voltage, thereby drastically cutting back SCR conduction angle and output voltage delivered to the overload.

As can be discerned, there has been disclosed a unique regulator circuit which is capable of controlling the voltage of a single or polyphase voltage source which is insensitive to input phase angle variations, input voltage and transient conditions, input frequency variations, input voltage waveform and load variations.

It will, therefore, be appreciated that the aforementioned and other desirable objects have been achieved; however, it should be emphasized that the particular embodiment of the invention, which is shown and described herein, is intended as merely illustrative and not as restrictive of the invention.

What is claimed is:

1. A power regulating circuit comprising a pair of controlled rectifiers connected in inverse parallel arrangement, means supplying an alternating voltage to said rectifier arrangement, means for sensing the voltage and current outputs of said arrangement, means including a transformer for supplying gating pulses to said rectifiers in response to said outputs, means supplying a wave form to the transformer in synchronism with said alternating voltage, and means for modulating the wave by said outputs which comprises a diode rectifier bridge, the anode and cathode terminals of opposed legs of the bridge being in circuit with the primary of the transformer, and switch means connected between the common anodes and cathodes.

2. A device as defined in claim 1 wherein the switch means comprises a transistor and Zener diode.

3. A device as defined in claim 1 wherein a signal produced by the sensors is applied in the base emitter circuit of the transistor.

References Cited

UNITED STATES PATENTS

| | | | |
|---|---|---|---|
| 3,270,270 | 8/1966 | Yenisey | 321—18 |
| 3,122,694 | 2/1964 | Muchnick et al. | 323—89 |
| 3,193,753 | 7/1965 | Fleming | 321—18 |
| 3,262,045 | 7/1966 | Hauck | 321—16 |
| 3,272,043 | 9/1966 | Clarke et al. | 321—18 |

JOHN F. COUCH, *Primary Examiner.*

A. D. PELLINEN, *Assistant Examiner.*